Feb. 13, 1968 R. G. FERRIS 3,368,529
ANIMAL FEEDING SYSTEM WITH INDIVIDUALLY ADJUSTABLE RATE OF FEED
Filed Feb. 3, 1966 3 Sheets-Sheet 1
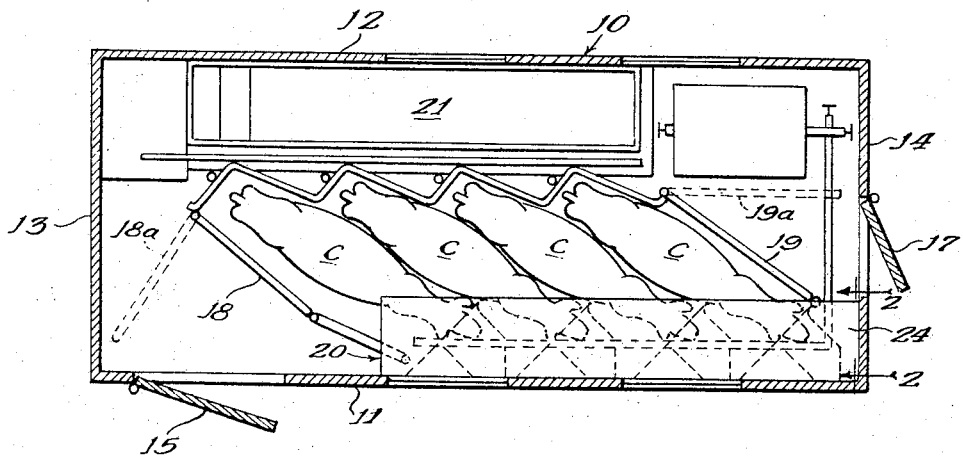
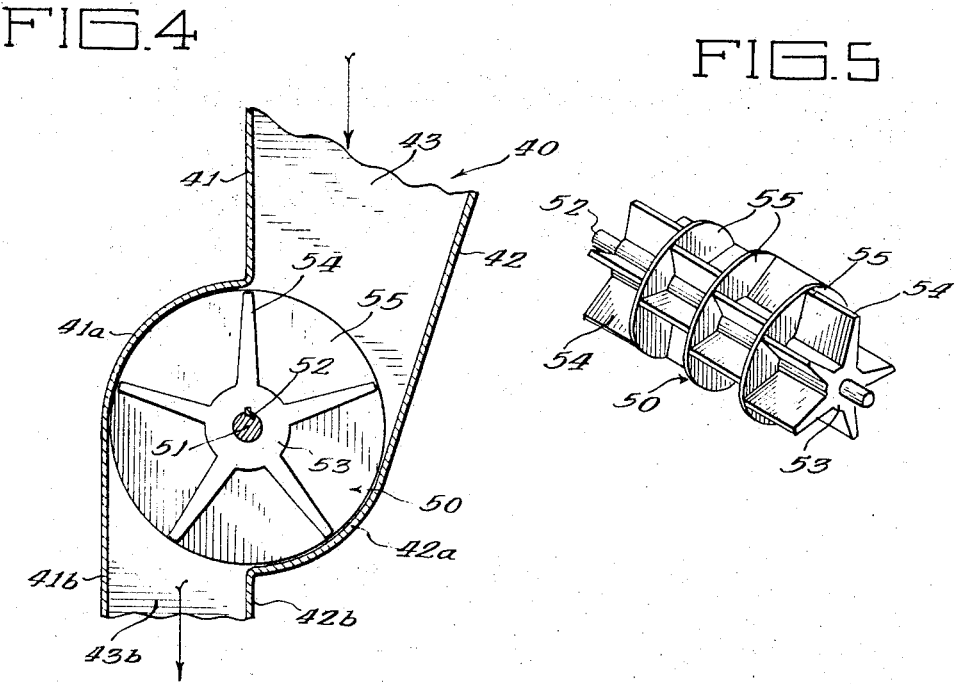
Inventor:
Robert G. Ferris

Feb. 13, 1968   R. G. FERRIS   3,368,529
ANIMAL FEEDING SYSTEM WITH INDIVIDUALLY ADJUSTABLE RATE OF FEED
Filed Feb. 3, 1966   3 Sheets-Sheet 2

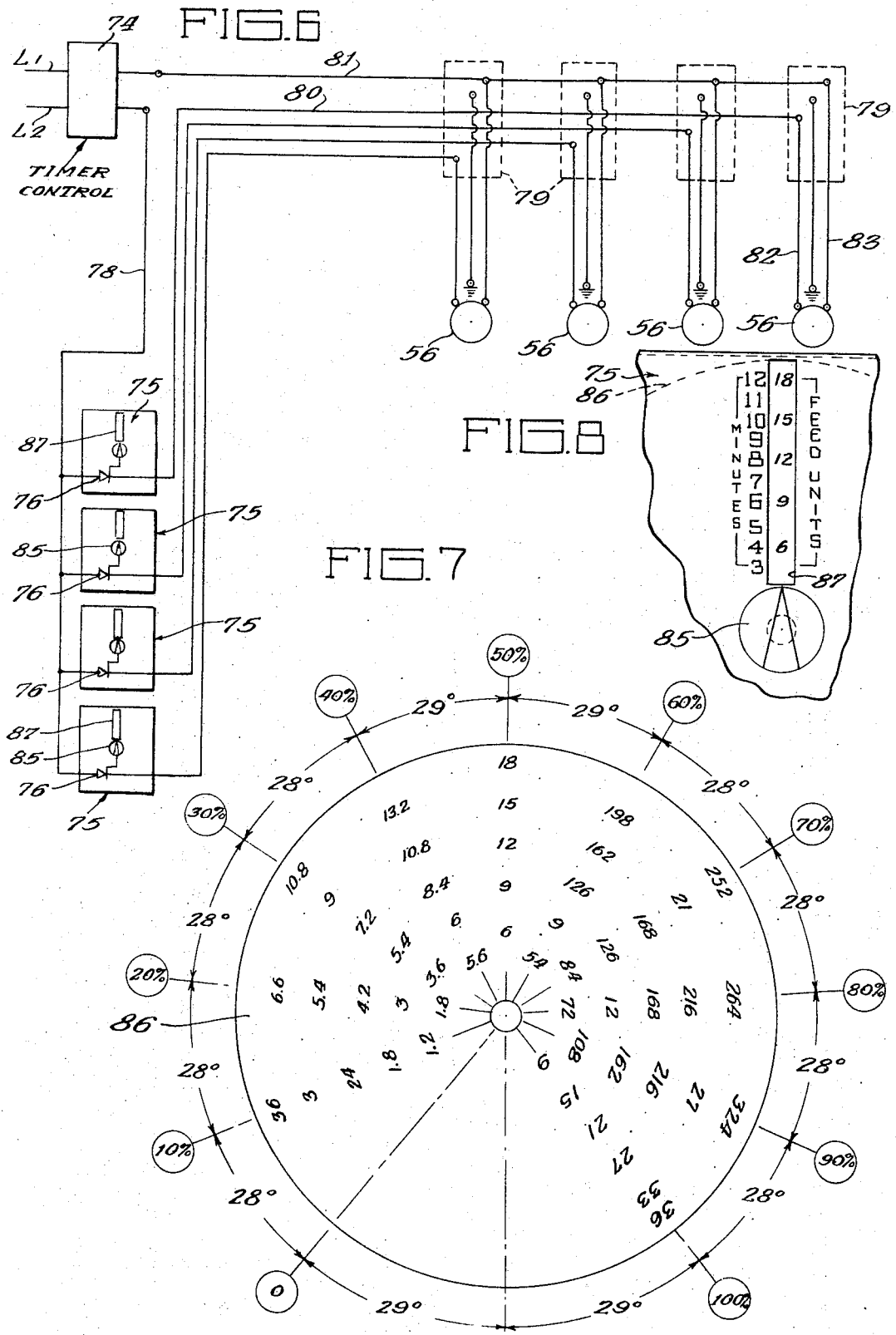

United States Patent Office 3,368,529
Patented Feb. 13, 1968

3,368,529
ANIMAL FEEDING SYSTEM WITH INDIVIDUALLY ADJUSTABLE RATE OF FEED
Robert G. Ferris, Harvard, Ill., assignor to Starline, Inc., a corporation of Illinois
Filed Feb. 3, 1966, Ser. No. 524,802
6 Claims. (Cl. 119—51.11)

ABSTRACT OF THE DISCLOSURE

A system for feeding a group of cows during milking including variable speed feed delivery means at each feeding position, means for establishing a single time period which is applicable to all said feed delivery means, and means for adjusting the drive means of each feed delivery means to cause the associated delivery means to dispense material in an unbroken flow at a selected rate of flow which is uniform throughout the time period, so that different cows may receive different quantities of feed during said period.

---

This invention relates in general to a material dispensing method and apparatus, and more particularly to a method and apparatus for delivering feed to a livestock feeding device.

In the recent past, it has become a common practice among dairy farmers to feed cows during their milking period. The theory underlying this procedure is that the cows are kept occupied and contented by feeding them during the milking period, and thus improve their milk output.

Another recent innovation commonly adopted by dairy farmers is the use of a milking parlor having the stalls arranged in herringbone fashion. It is thought that this arrangement encourages the cows to let a maximum quantity of milk, in that the cows are nested together in close association with one another, which has a tendency to improve the disposition of the animals. Additionally, the herringbone arrangement utilizes the available space in a milking parlor in a most economical fashion.

Certain difficulties have arisen in feeding cows in a milking parlor having a herringbone stall arrangement, and these difficulties are attributable mainly to the fact that some cows eat faster than other cows. Oftentimes a fast eating cow will finish its ration before the cow next to it, and it may move about in its stall and upset the cows in the adjacent stalls to disturb their milk production. A further complicating factor is that individual cows eat different amounts of feed, and thus problems have arisen in not only keeping a fast eating cow from disturbing its neighboring cows when it finishes its ration, but also in providing the proper amount of feed for each individual cow.

Those skilled in the art have recognized the problems discussed above, and many solutions have been proposed. For example, it has been proposed to feed each individual cow an amount of feed which is directly proportionate to the amount of milk which is let. Relatively complicated metering devices have been provided for this purpose, which are operatively responsive to the quantity of milk passing into a pipeline milking system. While these devices have functioned satisfactorily to keep individual cows supplied with a quantity of feed during their entire milking period, they do not solve the problem of the fast milking cow disturbing its neighbors after it has finished eating its ration.

It has also been proposed to feed a plurality of cows in a particular stall arrangement throughout their entire milking period by periodically providing quantities of feed at fixed intervals throughout the entire milking period. The milking period is fixed by the time required to milk the slowest milking cow. By varying the time between the delivery of successive increments of feed, it is possible to feed one cow more or less than another during the same period of time. This arrangement has the drawback that feed is delivered to the animals at spaced intervals rather than continuously, and it is possible that a fast eating animal might eat the entire amount metered during one interval before the next metered amount is delivered. Also, it has been found that the delivery of feed at fixed intervals causes the animals to eat at an uneven rate, which is not conducive to maximum milk production.

Accordingly, the general purpose of the present invention is to provide an improved material dispensing system, including method and apparatus, which obviates the problems noted above, and which is relatively simple in design and inexpensive to manufacture and maintain.

The primary object of the present invention is the provision of a method and means for dispensing a preselected quantity of feed at a uniform rate to each of a plurality of locations during a selected time interval.

Another object of the invention is to provide a continuous, uninterrupted flow of feed for an entire milking period to a group of cows to encourage the cows to eat at a uniform rate.

A further object of the invention is to provide convenient means whereby a farmer can readily vary and control the ration of feed being fed to each individual cow.

These and other objects of the invention will hereinafter become more fully apparent from the following description, taken in connection with the annexed drawings, wherein:

FIG. 1 is a top plan schematic view of a milking parlor having the feed dispensing means of the present invention therein;

FIG. 4 is an enlarged fragmentary sectional view, taken generally along line 4—4 of FIG. 3;

FIG. 5 is a perspective view of the feed delivery wheel illustrated in FIG. 4;

FIG. 6 is a schematic electrical diagram of the control means for the present invention;

FIG. 7 is a plan view of a dial of a control for selecting the amount of feed to be dispensed into a particular feed box; and FIG. 8 is a fragmentary plan view of the control mentioned in the description of FIG. 7.

Figure 2:
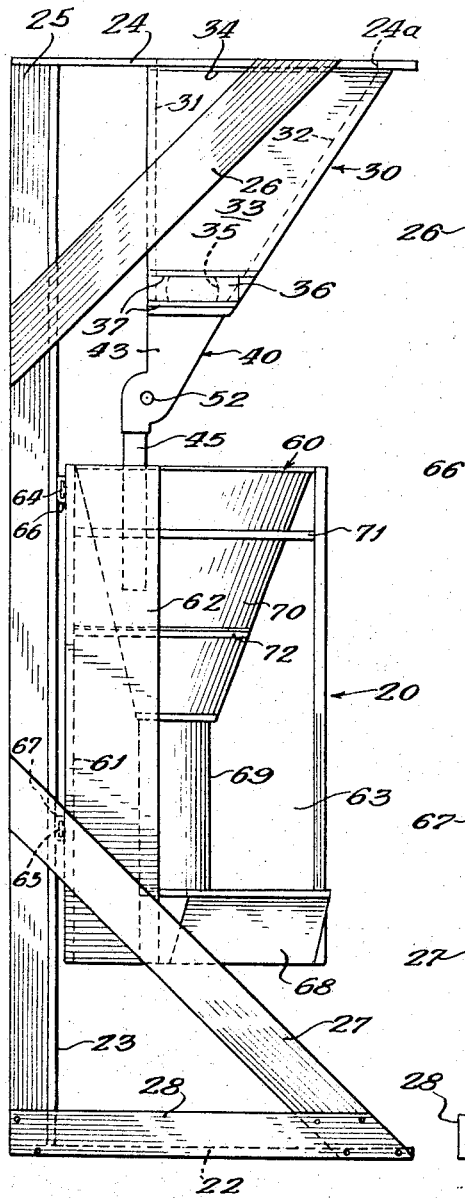
FIG. 2 is an enlarged side elevational view of the feed dispensing means of the present invention, taken generally along line 2—2 of FIG. 1.

While this invention is susceptible of embodiment in many different forms, there is shown in the drawings, and will herein be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, a milking parlor 10 is shown in FIG. 1 to include upright front and rear walls 11 and 12, respectively, and transverse side walls 13 and 14. An entrance door 15 is provided in front wall 11 adjacent side wall 13, and an exit door 17 is provided in side wall 14 approximately in the center thereof. Cow feeding means 20 is provided in milking parlor 10 adjacent the front wall 11 thereof. As will hereinafter become more fully apparent, the individual feed boxes of the cow feeding means 20 are arranged at an angle with respect to the front wall 11 of milking parlor 10 to define a herringbone feeding arrangement.

The feeding means 20, illustrated in FIG. 1, includes four individual feed boxes, and cows C are shown in full lines in feeding and milking position. A movable gate 18 is provided at the entrance end of the feeding means 20, and is movable to an open position shown in broken lines at 18a to allow the cows to gain access to the individual feed boxes. Once the cows are in the position shown in FIG. 1, the gate 18 is moved to the closed position to positively maintain the cows in the herringbone arrangement. A second movable gate 19 is provided at the exit end of the feeding means 20, and is movable to an open position shown in broken lines at 19a to enable the cows to move away from the feeding means 20, and outwardly of the milking parlor through door 17. As is well known in the art, automatic milking apparatus is provided rearwardly of and below the cows C, and a depressed area 21 is provided in the milking parlor 10 adjacent the rear wall 12 to enable an attendant to move around and have access to the cows.

Figure 3:
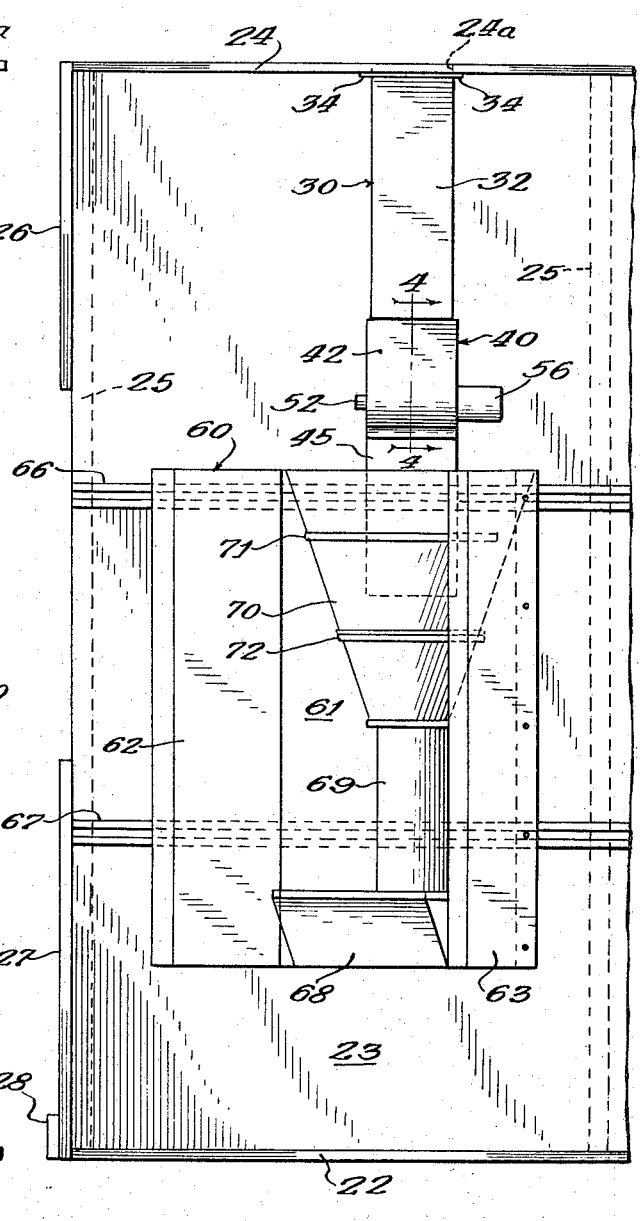
FIG. 3 is a fragmentary front elevational view of the structure shown in FIG. 2, and illustrating the feed dispensing means of one stall.

Frame means are provided for supporting the feeding means 20, and will be best understood from a consideration of FIGS. 2 and 3. The frame means includes a horizontal base member 22, a vertical upright member 23 secured to base member 22, and a horizontally disposed top member 24 secured to the upper end of upright member 23. Upright frame member 23 is preferably spaced inwardly from the rearmost ends of members 22 and 24, and a plurality of vertical support members 25 are secured to frame members 22, 23 and 24 rearwardly of member 23. Inclined brace members 26 and 27 are preferably secured to frame members 24 and 25, and 22 and 25, respectively, to add stability to the structure. Additional horizontally disposed brace members 28 may be provided at the lower end of the frame to further rigidify the structure.

Openings 24a (one of which is shown in FIGS. 2 and 3) are provided in top frame member 24 for delivery of feed downwardly from the frame member 24 to the feeding means 20 disposed therebelow. Feed may be fed through the openings 24a manually, or by mechanical means, such as an auger conveyor, not shown.

A hopper 30 is secured to the undersurface of top frame member 24 under each opening 24a. Each hopper 30 includes a generally vertically disposed rear wall 31, a downwardly and rearwardly inclined front wall 32, and trapezoidally shaped side walls 33. Flanges 34 extend laterally outwardly of side walls 33 and are secured to the undersurface of top frame member 24. An access opening 35 may be provided in one side wall 33 of hopper 30 for releasing any blockage which may occur at the narrowed discharge portion at the lower end of hopper 30. A closure plate 36 is illustrated as being slidably mounted in guides 37, and normally closes the access opening 35.

A second hopper 40 communicates with the lower end of each hopper 30, and the structure of hoppers 40 will be best understood from a consideration of FIG. 4. Each hopper 40 includes a generally vertically disposed rear wall 41, a downwardly and rearwardly inclined front wall 42, and parallel side walls 43. Feed delivery means 50 is mounted in hopper 40 for rotation about an axis 51 extending transversely of hopper side wall 43. Hopper front and rear walls 41 and 42 include arcuate intermediate portions 41a and 42a which are concentric with the axis 51 to define a somewhat cylindrically shaped throat within which the feed delivery means 50 rotates. Hopper walls 41 and 42 include further generally vertically disposed lower portions 41b and 42b which cooperate with the lower portions 43b of the hopper side walls to define a generally rectangularly shaped feed discharge opening. The lower portion of the hopper 40 communicates with a discharge chute 45 which delivers feed into the feeding means 20 to be hereafter described.

Each feed delivery means 50 includes a shaft 52 rotatably journalled in the side walls 43 of its respective hopper 40. A plurality of paddle wheels are fixed on shaft 52 for rotation therewith, and each paddle wheel includes a hub 53 fixed on shaft 52 and a plurality of radially extending vanes or spokes 54. Separator spacers 55 are provided on shaft 52 between adjacent paddle wheels. A motor 56 is secured to one side wall 43 of each hopper 40, and is drivingly connected with the shaft 52 of the feed delivery means 50. The motor 56 of each hopper 40 is rotated at a selected constant speed by control means to be hereafter described so that the feed delivery means 50 for each feed box will continuously deliver an unbroken flow of feed during a predetermined time period at a uniform rate.

The feeding means 20 includes a plurality of feed stall headers 60, one for each stall in the herringbone arrangement. Each header 60 includes a vertical back wall 61 generally parallel with frame member 23, and side walls 62 and 63 extending forwardly from back wall 61 at an angle with respect thereto. In the illustrated embodiment, the feed stall headers 60 are adjustably mounted on the frame by having vertically spaced riders 64 and 65 on back wall portion 61 received in vertically spaced tracks 66 and 67, respectively, on frame portion 23. A feed bowl 68 is secured to each header 60 at the lower portion thereof between side walls 62 and 63, and a vertically disposed chute 69 communicates with each feed bowl 68. Each chute 69 is connected to a downwardly tapering, generally conically shaped hopper 70 which receives the supply of feed from chute 45. Hoppers 70 are preferably secured to headers 60 by surrounding straps 71 and 72.

The control means for each motor 56 is shown diagrammatically in FIG. 6. The control means includes a timer control 74 connected across lines L1 and L2 connected to a suitable source of alternating current. The timer control 74 is an adjustable device which can be set to close a circuit including lines L1 and L2 for a desired period of time. In the present invention, the timer 74 is set to complete a circuit to the motors 56 for a length of time corresponding to the time required to milk the slowest milking cow in a group of cows in the milking parlor. In order that each of the cows in the group be occupied and contented throughout the entire milking period, it is desirable to operate each of the motors 56 at a fixed speed throughout the entire milking period, so that feed will be delivered to the individual feed boxes 68 in an unbroken flow at a constant rate. Since each of the cows in the group may require a different amount of feed, means are provided for adjusting the rotational speed of each of the individual motors 56, so that a pre-selected amount of feed can be delivered to each of the individual feed boxes 68 during the milking period.

A suitable motor speed control device 75 is provided for each motor 56, and in an exemplary embodiment, the motor speed control device 75 includes a silicon control rectifier (SCR) 76. The SCR's 76 are connected to line L2 through the timer control 74 by a lead 78. Leads 82 and 83 of each motor 56 are connected in a terminal box 79 to leads 80 and 81, respectively, which are in turn respectively connected to SCR 76 and lead L1. For purposes of the present invention, the SCR's 76 are utilized as voltage regulating devices which control the speed of motors 56 by controlling the voltage impressed thereacross. A suitable circuit, not shown, may be provided for controlling the SCR's 76, and such a circuit typically includes a charging capacitor and a variable resistor. By adjusting the variable resistor, the time at which the SCR's fire and hence the average voltage across the motors 56, and thus their speed, can be regulated. A suitable SCR unit is available from the International Electronics Co., Ltd. under Model No. M-10. A salient advantage of the SCR control is that the motor torque will remain constant regardless of the motor speed within certain limits. In contrast to this, if a normal or common rheostat were used to affect the line voltage and change the speed of the motor, the production of torque would be materially reduced as the motor slows down.

A control knob 85 and indicating disc 86 are fixed on the operating shaft of the variable resistor of the SCR control unit 75, with the disc 86 being provided within the casing of the unit, and the knob 85 being provided externally of the unit. A vertical slot 87 is provided in the casing of each unit 75 to expose the indicia on dial 86. As is best seen in FIG. 7, the dial 86 contains ten sets of indicia, each corresponding to a speed for a particular motor 56. In the illustrated embodiment, the sets of indicia correspond to 10% increments of speed between 0 r.p.m. and 100% rated speed. The indicia on the dial 86 indicate units of feed, preferably pounds, which are distributed during the milking period. A scale, corresponding to the selection range for timer control 74, is provided at the left hand side of slot 87 in the cover of unit 75 for ease of reading in determining the amount of feed which is to be dispensed to a particular animal.

From the above, it is believed that the operation of the system will be readily apparent to those skilled in the art. The timer control 74 is set for a time corresponding to the amount of time necessary to milk the slowest milking cow in a particular group of cows in the milking parlor. Assuming that the attendant is familiar with the eating habits of each of the cows, the SCR control 75 for each motor 56 is then set to provide each cow with the proper amount of feed by rotating the knob 85 until the amount of feed corresponding to the selected time period appears in slot 87. By rotating the knob 85 to this desired feed amount, the speed of the particular motor 56 is adjusted to a rate which will deliver the selected amount of feed uniformly and continuously throughout the milking period. Thus, with the present invention, each of the cows in the milking parlor can receive a preselected quantity of feed at a uniform rate during a selected time interval. Accordingly, it is believed that each of the objects of the invention has been fully achieved.

I claim:

1. A system for feeding a group of cows during milking comprising: means defining a plurality of feeding locations that include a separate feeding location for each cow; delivery means for dispensing an unbroken flow of material at each location; means for establishing a single time period which is applicable to all said delivery means; adjustable drive means at each location for continuously operating the delivery means at said location at a uniform rate to deliver an unbroken flow of material throughout said time period; and means for adjusting each of said drive means to cause the associated delivery means to dispense material in said unbroken flow at a selected rate of flow which is uniform throughout the time period, whereby various preselected amounts of material may be delivered to said feeding locations at different rates of flow which are uniform from the beginning to the end of the time period.

2. The system of claim 1 wherein said drive means is a variable speed motor, and the means for adjusting the drive means preselects the speed of said motor.

3. The system of claim 2 wherein said motor includes a rotatable shaft, said delivery means includes a hopper, a metering member rotatably mounted in said hopper, and means connecting said metering member for rotation by said rotatable shaft.

4. The system of claim 2 wherein said drive means is an electric motor.

5. The system of claim 4 wherein said adjusting means includes means for varying the voltage impressed across said motor.

6. The system of claim 5 wherein the means for varying the voltage impressed across said motor includes a silicon controlled retifier.

References Cited

UNITED STATES PATENTS

| | | | |
|---|---|---|---|
| 983,919 | 2/1911 | McGuigan | 119—51.11 |
| 2,969,039 | 1/1961 | Golay | 119—14.03 |
| 3,041,478 | 6/1962 | Gabor | 318—345 |
| 3,101,159 | 8/1963 | Fletcher | 222—70 |
| 3,103,912 | 9/1963 | Benedetto | 119—14.04 |
| 3,111,113 | 11/1963 | Jaquith | 119—14.17 |
| 3,144,173 | 8/1964 | France et al. | 119—56 X |
| 3,157,157 | 11/1964 | Clay et al. | 119—51.11 |
| 3,171,385 | 3/1965 | Decker | 119—51.11 |
| 3,191,577 | 6/1965 | McMurray | 119—51 X |
| 3,272,180 | 9/1966 | Schommer | 119—52 |

ALDRICH F. MEDBERY, *Primary Examiner.*